United States Patent
Salo

(10) Patent No.: US 9,243,936 B2
(45) Date of Patent: Jan. 26, 2016

(54) MEASURING SENSOR

(71) Applicant: JANESKO OY, Vantaa (FI)

(72) Inventor: Harri J. Salo, Vantaa (FI)

(73) Assignee: JANESKO OY, Wantaa (FI)

( * ) Notice: Subject to any disclaimer, the term of this patent is extended or adjusted under 35 U.S.C. 154(b) by 0 days.

(21) Appl. No.: 13/828,052

(22) Filed: Mar. 14, 2013

(65) Prior Publication Data

US 2013/0239678 A1 Sep. 19, 2013

(30) Foreign Application Priority Data

Mar. 16, 2012 (FI) ...................................... 20125293

(51) Int. Cl.
*G01D 11/24* (2006.01)

(52) U.S. Cl.
CPC ......... *G01D 11/245* (2013.01); *Y10T 29/49002* (2015.01)

(58) Field of Classification Search
CPC .................................................. G01D 11/245
USPC .............................. 73/431; 374/208; 29/592.1
See application file for complete search history.

(56) References Cited

U.S. PATENT DOCUMENTS

| | | | |
|---|---|---|---|
| 5,610,571 A | 3/1997 | Kuzuoka | |
| 6,176,138 B1* | 1/2001 | Barr et al. | 73/756 |
| 6,352,361 B1* | 3/2002 | Nimberger et al. | 374/142 |
| 6,422,766 B1* | 7/2002 | Althaus et al. | 385/94 |
| 7,080,941 B1* | 7/2006 | Benjamin et al. | 374/179 |
| 7,312,690 B1 | 12/2007 | Geer | |
| 2002/0053603 A1* | 5/2002 | Bernini | 237/8 A |
| 2003/0081648 A1 | 5/2003 | Meier | |
| 2008/0202219 A1* | 8/2008 | Schmidt | 73/64.48 |
| 2010/0091816 A1* | 4/2010 | Schroll et al. | 374/165 |
| 2011/0122918 A1* | 5/2011 | Murray | 374/208 |
| 2011/0235680 A1* | 9/2011 | Seigneur et al. | 374/208 |
| 2011/0283787 A1* | 11/2011 | Kramer et al. | 73/204.26 |

FOREIGN PATENT DOCUMENTS

| | | |
|---|---|---|
| DE | 42 23 440 A1 | 1/1994 |
| DE | 197 20 504 A1 | 11/1998 |
| EP | 0 042 086 A2 | 12/1981 |
| EP | 0 701 110 A2 | 3/1996 |
| WO | WO 92/02794 A1 | 2/1992 |

OTHER PUBLICATIONS

Finnish Search Report issued on Oct. 18, 2012.

* cited by examiner

*Primary Examiner* — Lisa Caputo
*Assistant Examiner* — Jamel Williams
(74) *Attorney, Agent, or Firm* — Buchanan Ingersoll & Rooney PC

(57) ABSTRACT

A measuring sensor includes an elongated shell part, manufactured from a synthetic gemstone material or ceramic material, is provided with a first end and a second end, the first end being arranged in a process medium to be measured. A housing structure is manufactured from a material softer than the synthetic gemstone material or the ceramic material and arranged to surround the measuring electronics. The second end of the elongated shell part is arranged to be supported against the housing structure. The elongated shell part is fastened to the housing structure by a connecting piece manufactured from a material having a hardness property between hardness properties of the material of manufacture of the elongated shell part and the material of manufacture of the housing structure.

18 Claims, 1 Drawing Sheet

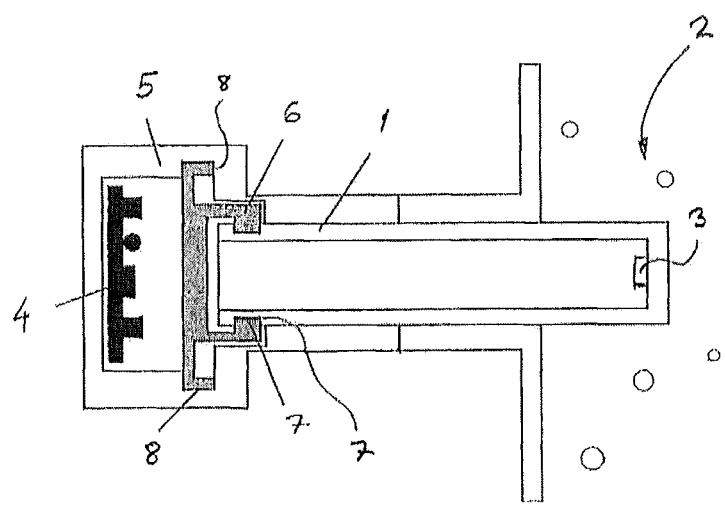

MEASURING SENSOR

RELATED APPLICATION(S)

This application claims priority under 35 U.S.C. §119 to Finnish Patent Application No. 20125293 filed in Finland on Mar. 16, 2012, the entire content of which is incorporated herein in its entirety.

FIELD

The disclosure, relates to a measuring sensor.

BACKGROUND INFORMATION

Various measuring events are involved in the process industry. In certain sectors, however, the measuring events can be technically challenging situations. An example of process industry sectors wherein special specifications are set for measuring devices used in liquid measurement, for instance, in the semiconductor industry. In the semiconductor industry, liquids used in the process can be highly corrosive acids or bases. Examples thereof include KOH, hydrogen peroxide, and hydrogen fluoride (HF).

The character of the process of the semiconductor industry, metals can be forbidden materials in parts that come into contact with the process. A small amount of metal ions can contaminate the end products of the process, for example, microcircuits. Consequently, as the structural materials for process measuring devices and actuators, the semiconductor industry uses plastics and minerals. Examples of the materials used include fluoroplastics (PTFE, PVDF, PFA, ECTFE) and synthetic gemstones, such as Spinel, YAG, GGG, and sapphire.

Fluoroplastics can be used for structural materials for pipe system parts in the semiconductor industry, since they can be relatively easy to work with, are light and relatively reasonably priced. However, the physical properties of the plastics can be limited, and in connection with optical tasks or tasks using heat conduction, such that synthetic gemstones or minerals are used instead.

The optical properties and wearing properties of non-metal, synthetic gemstones can be excellent, and heat conductivity, for instance, is in the same order as that of metal materials. Ceramic materials, too, have similar properties, so these non-metal materials can also be usable in some embodiments.

On the basis of the foregoing, the aforementioned materials can be suitable for use as structural materials in the semiconductor industry in demanding tasks.

An issue with the known art is the fastening of parts manufactured from the aforementioned materials, for example, synthetic gemstone, and parts manufactured from a plastic material. In measuring sensors used in the semiconductor industry, for instance, the part contacting with the process medium can be manufactured from a synthetic gemstone material while the rest of the mechanics is made of plastic.

In the above-described situation, it can be difficult to find a way of connection that would be optimal in every respect. Screw and thread connections are seldom used because of the hardness of synthetic gemstones. Press and fitting connections may not be possible because of the poor mechanical properties of plastics.

For example, a window or a measuring sensor manufactured from a synthetic gemstone can be subjected to forces caused by the process, such as flow and pressure, as well as forces caused by using the device, such as torsion, tension, and compression. Synthetic gemstones can also be more difficult and more expensive to work than plastics and metals, so the mechanical shapes of parts manufactured from a synthetic gemstone can be relatively simple.

SUMMARY

A measuring sensor is disclosed comprising: an elongated shell part manufactured from a non-metal material and provided with a first end and a second end, the first end configured to be arranged in a process medium to be measured; a sensor part arranged inside the first end of the elongated shell part; measuring electronics; a housing structure manufactured from a material softer than the non-metal material and arranged to surround the measuring electronics, the second end of the elongated shell part being arranged to be supported against the housing structure; and a connecting piece which is manufactured from a material having a hardness property between hardness properties of a material of manufacture of the elongated shell part and a material of manufacture of the housing structure, and wherein the connecting piece is arranged to fasten the elongated shell part to the housing structure.

A method of assembling a measuring sensor for sensing a process medium, comprising: providing an elongated shell part manufactured from a synthetic gemstone material or a ceramic material, the elongated shell part having a first end and a second end; placing a sensor part inside the first end of the elongated shell part; providing a housing structure manufactured from a material softer than the synthetic gemstone material or the ceramic material, the second end of the elongated shell part being arranged to be supported against the housing structure; manufacturing a connecting piece from a material having a hardness property between hardness properties of a material of manufacture of the elongated shell part and a material of manufacture of the housing structure; and fastening the elongated shell part to the housing structure with the connecting piece.

BRIEF DESCRIPTION OF THE DRAWINGS

The disclosure will be described in greater detail by description of exemplary embodiments with reference to the accompanying drawings, wherein FIG. 1 schematically shows an exemplary embodiment of a measuring sensor.

DETAILED DESCRIPTION

In accordance with an exemplary embodiment, a measuring sensor is disclosed, which includes an elongated shell part manufactured from a synthetic gemstone material or a ceramic material and provided with a first end and a second end, the first end being meant to be arranged in a process medium to be measured, a sensor part arranged in the first end of the elongated shell part, inside the shell part, measuring electronics, and a housing structure manufactured from a material softer than the synthetic gemstone material or the ceramic material and arranged to surround the measuring electronics, the second end of the elongated shell part being arranged to be supported against the housing structure.

In accordance with an exemplary embodiment, a measuring sensor is disclosed, which includes elongated shell part, which is fastened to the housing structure by means of a connecting piece, which is manufactured from a material having a hardness property between hardness properties of a material of manufacture of the elongated shell part and a material of manufacture of the housing structure.

In accordance with an exemplary embodiment, the measuring sensor based on its simplicity and versatility, can be relatively inexpensive to commission and use. In addition, the versatility of the measuring sensor enables the measuring sensor to be applied to different constructions.

An exemplary embodiment is described in closer detail by means of an exemplary embodiment illustrated in the accompanying drawing, wherein FIG. 1 is a schematic sectional side view of a measuring sensor according to the disclosure.

In FIG. 1, which schematically shows an exemplary embodiment of the measuring sensor, reference number 1 denotes an elongated shell part made from a synthetic gemstone material. A first end of the elongated shell part is arranged in a process medium 2 to be measured. The process medium to be measured may be, for example, in a process pipe or a process silo whose wall is provided with a fitting via which the measuring sensor is arranged such that the first end of the elongated shell part comes into contact with the process medium. The process medium 2 may be, for example, a process liquid.

Reference number 3 in the FIGURE denotes a sensor part arranged in the first end of the shell part 1, inside the shell part. The sensor part 3 may be a sensor part for measuring temperature, for example.

Reference number 4 in the FIGURE denotes measuring electronics. The sensor part 3 and the measuring electronics 4 are interconnected by conductors. No conductors are shown in the FIGURE. Reference number 5 denotes a housing structure manufactured from a material softer than the synthetic gemstone material and arranged to surround the measuring electronics and, in the example of FIG. 1, a part of the elongated shell part 1 as well. A second end of the elongated shell part 1 is arranged to be supported against the housing structure 5.

The structures and the operation thereof which represent technology known to those skilled in the art are not explained in closer detail herein.

In accordance with an exemplary embodiment, the elongated shell part 1 is fastened to the housing structure 5 by means of a connecting piece 6. The connecting piece 6 is manufactured from a material whose mechanical properties are between the material of manufacture of the elongated shell part 1 and the material of manufacture of the housing structure 5. The housing structure 5 may be formed from one uniform piece, or it may be a structure formed from several pieces. The connecting piece may also be a uniform part or a piece formed from several parts joined together.

In accordance with an exemplary embodiment, the measuring sensor includes a relatively hard and fragile elongated shell part 1 manufactured from a synthetic gemstone, for example, which is connected to the housing structure 5 manufactured from a plastic material, for example, by means of the connecting piece 6. In accordance with an exemplary embodiment, the connecting piece 6 is manufactured from a material whose mechanical properties, for example, hardness is between hard gemstone and soft plastic. The connecting piece 6 may be manufactured from a composite material or a metal material, for example.

In accordance with an exemplary embodiment, a contact surface area between the connecting piece 6 and the elongated shell part 1 is arranged to be smaller than a contact surface area between the connecting piece 6 and the housing structure 5. In accordance with an exemplary embodiment, the geometry of the connecting piece 6 may be complex. The connecting piece can be used for increasing the mechanical contact surface area of the softer material, for example, a plastic material, in which case the surfaces are subjected to smaller forces, which can make the connection relatively more reliable. The connecting piece 6 may be considered as a transformer of connection pressures of the parts, for example, the surface pressures between the synthetic gemstone and the connecting piece 6 are higher than between the connecting piece 6 and the plastic material.

The contact surface between the elongated shell part 1 and the connecting piece 6 and, correspondingly, the contact surface between the connecting piece 6 and the housing structure 5, can be formed by means of a plurality of support surfaces 7, 8. In accordance with an exemplary embodiment, the connecting piece 6 can be fastened to the synthetic gemstone by a sufficient number of appropriately shaped support surfaces 7, which can eliminates forces and torsional motions in XYZ directions that are directed at the gemstone. The connection between the connecting piece 6 and the plastic material is locked with the same principle, for example, a sufficient number of support surfaces 8 is arranged to lock the torsion and XYZ motions. The support surfaces 7, 8 may be different suitable surfaces. Examples of suitable surfaces include plane surfaces, cylinder surfaces and/or spherical surfaces.

In exemplary measuring devices, heat transmission between the process and the environment is to be minimized for accurate measurement and cooling of the measuring electronics. For the aforementioned reason, the cross-sectional area and mass of the connecting piece are also to be minimized. At the same time, however, a sufficient structural strength is to be retained.

The disclosure has been described above by reference to an exemplary embodiment shown in the FIGURE. The disclosure is not, however, restricted in any way to the example of the FIGURE but the disclosure may be freely modified within the scope of the claims. For example, the shape and dimension, for example, of different details of the disclosure may be freely modified as desired. Also, for example, rather than a synthetic gemstone material, a ceramic material may also be used, as stated herein.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A measuring sensor comprising: an elongated shell part manufactured from a non-metal material and provided with a first end and a second end, the first end configured to be arranged in a liquid process medium to be measured;
   a sensor part arranged inside the first end of the elongated shell part;
   measuring electronics;
   a housing structure manufactured from a material softer than the non-metal material and arranged to surround the measuring electronics, the second end of the elongated shell part being arranged to be supported against the housing structure; and
   a connecting piece which is manufactured from a material having a hardness property between hardness properties of a material of manufacture of the elongated shell part and a material of manufacture of the housing structure, and wherein the connecting piece is arranged to fasten the elongated shell part to the housing structure, wherein the sensor is on the first end of the elongated shell part.

2. A measuring sensor as claimed in claim 1, wherein the non-metal material is a synthetic gemstone or ceramic material, the sensor comprising:
a contact surface area between the connecting piece and the elongated shell part, which is arranged to be smaller than a contact surface area between the connecting piece and the housing structure.

3. A measuring sensor as claimed in claim 2, wherein the contact surface area between the elongated shell part and the connecting piece, and the contact surface area between the connecting piece and the housing structure are formed by a plurality of support surfaces.

4. A measuring sensor as claimed in claim 3, wherein the plurality of support surfaces are planar surfaces.

5. A measuring sensor as claimed in claim 3, wherein the plurality of support surfaces are cylindrical surfaces.

6. A measuring sensor as claimed in claim 3, wherein the plurality of support surface are spherical surfaces.

7. A measuring sensor as claimed in claim 1, wherein the non-metal material is a synthetic gemstone or ceramic material, and wherein the connecting piece is manufactured from a metal or composite material.

8. A measuring sensor as claimed in claim 1, wherein the non-metal material is a synthetic gemstone or ceramic material, and wherein the housing structure is manufactured from a plastic material.

9. A measuring sensor as claimed in claim 1, in combination with a process medium.

10. A method of assembling a measuring sensor for sensing a liquid process medium, comprising:
providing an elongated shell part manufactured from a synthetic gemstone material or a ceramic material, the elongated shell part having a first end and a second end;
placing a sensor part inside the first end of the elongated shell part; providing a housing structure manufactured from a material softer than the synthetic gemstone material or the ceramic material, the second end of the elongated shell part being arranged to be supported against the housing structure;
manufacturing a connecting piece from a material having a hardness property between hardness properties of a material of manufacture of the elongated shell part and a material of manufacture of the housing structure; and
fastening the elongated shell part to the housing structure with the connecting piece, wherein the sensor is on the first end of the elongated shell part.

11. The method as claimed in claim 10, comprising:
placing measuring electronics within the housing structure, wherein the housing structure surrounds the measuring electronics.

12. The method as claimed in claim 10, comprising:
providing a contact surface area between the connecting piece and the elongated shell part, which is arranged to be smaller than a contact surface area between the connecting piece and the housing structure.

13. The method as claimed in claim 12, comprising:
forming the contact surface area between the elongated shell part and the connecting piece, and the contact surface area between the connecting piece and the housing structure, with a plurality of support surfaces.

14. The method as claimed in claim 13, wherein the plurality of support surfaces are planar surfaces.

15. The method as claimed in claim 13, wherein the plurality of support surfaces are cylindrical surfaces.

16. The method as claimed in claim 13, wherein the plurality of support surface are spherical surfaces.

17. The method as claimed in claim 10, comprising:
manufacturing the connecting piece from a metal or composite material.

18. The method as claimed in claim 10, comprising:
manufacturing the housing structure from a plastic material.

* * * * *